US009855888B1

(12) United States Patent
Dellock et al.

(10) Patent No.: US 9,855,888 B1
(45) Date of Patent: Jan. 2, 2018

(54) PHOTOLUMINESCENT VEHICLE APPLIQUES

(71) Applicant: Ford Global Technologies, LLC, Dearborn, MI (US)

(72) Inventors: Paul Kenneth Dellock, Northville, MI (US); Stuart C. Salter, White Lake, MI (US); Aaron Bradley Johnson, Allen Park, MI (US); Talat Karmo, Waterford, MI (US); Michael Musleh, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/196,482

(22) Filed: Jun. 29, 2016

(51) Int. Cl.

| | |
|---|---|
| ***F21V 11/00*** | (2015.01) |
| ***B60Q 1/00*** | (2006.01) |
| ***B60Q 1/26*** | (2006.01) |
| ***B60Q 11/00*** | (2006.01) |
| ***B60Q 1/28*** | (2006.01) |
| ***B60Q 3/02*** | (2006.01) |
| ***F21V 13/08*** | (2006.01) |

(52) U.S. Cl.
CPC ................. *B60Q 1/28* (2013.01); *B60Q 3/02* (2013.01); *F21V 13/08* (2013.01)

(58) Field of Classification Search
CPC .............. B60Q 1/28; B60Q 3/02; F21V 13/08
See application file for complete search history.

(56) References Cited

U.S. PATENT DOCUMENTS

| | | |
|---|---|---|
| 2,486,859 A | 11/1949 | Meijer et al. |
| 4,935,722 A | 6/1990 | Pollack |
| 5,053,930 A | 10/1991 | Benavides |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,565,770 B1 | 5/2003 | Mayer et al. |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Donald Raleigh
(74) *Attorney, Agent, or Firm* — Jason Rogers; Price Heneveld LLP

(57) ABSTRACT

A vehicle applique is provided that includes a decorative layer and an over-mold positioned over the decorative layer. The over-mold is substantially transparent. A semiconductor layer is positioned on an opposite side of the decorative layer from the over-mold. The semiconductor layer is configured to emit light through the decorative layer.

17 Claims, 9 Drawing Sheets

(56) References Cited

U.S. PATENT DOCUMENTS 6,990,922 B2 1/2006 Ichikawa et al.
7,015,893 B2 3/2006 Li et al.
7,161,472 B2 1/2007 Strumolo et al.
7,213,923 B2 5/2007 Liu et al.
7,216,997 B2 5/2007 Anderson, Jr.
7,249,869 B2 * 7/2007 Takahashi ............. B60R 13/005 362/300
7,264,366 B2 9/2007 Hulse
7,264,367 B2 9/2007 Hulse
7,441,914 B2 10/2008 Palmer et al.
7,501,749 B2 3/2009 Takeda et al.
7,575,349 B2 8/2009 Bucher et al.
7,635,212 B2 12/2009 Seidler
7,726,856 B2 6/2010 Tsutsumi
7,745,818 B2 6/2010 Sofue et al.
7,753,541 B2 7/2010 Chen et al.
7,834,548 B2 11/2010 Jousse et al.
7,862,220 B2 1/2011 Cannon et al.
7,987,030 B2 7/2011 Flores et al.
8,016,465 B2 9/2011 Egerer et al.
8,022,818 B2 9/2011 la Tendresse et al.
8,030,624 B2 10/2011 Kalish et al.
8,044,415 B2 10/2011 Messere et al.
8,066,416 B2 11/2011 Bucher
8,071,988 B2 12/2011 Lee et al.
8,097,843 B2 1/2012 Agrawal et al.
8,120,236 B2 2/2012 Auday et al.
8,136,425 B2 3/2012 Bostick
8,163,201 B2 4/2012 Agrawal et al.
8,178,852 B2 5/2012 Kingsley et al.
8,197,105 B2 6/2012 Yang
8,203,260 B2 6/2012 Li et al.
8,207,511 B2 6/2012 Bortz et al.
8,232,533 B2 7/2012 Kingsley et al.
8,247,761 B1 8/2012 Agrawal et al.
8,286,378 B2 10/2012 Martin et al.
8,408,766 B2 4/2013 Wilson et al.
8,415,642 B2 4/2013 Kingsley et al.
8,421,811 B2 4/2013 Odland et al.
8,466,438 B2 6/2013 Lambert et al.
8,519,359 B2 8/2013 Kingsley et al.
8,519,362 B2 8/2013 Labrot et al.
8,552,848 B2 10/2013 Rao et al.
8,606,430 B2 12/2013 Seder et al.
8,624,716 B2 1/2014 Englander
8,631,598 B2 1/2014 Li et al.
8,664,624 B2 3/2014 Kingsley et al.
8,683,722 B1 4/2014 Cowan
8,724,054 B2 5/2014 Jones
8,754,426 B2 6/2014 Marx et al.
8,773,012 B2 7/2014 Ryu et al.
8,846,184 B2 9/2014 Agrawal et al.
8,851,694 B2 10/2014 Harada
8,876,352 B2 11/2014 Robbins et al.
8,952,341 B2 2/2015 Kingsley et al.
8,994,495 B2 3/2015 Dassanayake et al.
9,006,751 B2 4/2015 Kleo et al.
9,018,833 B2 4/2015 Lowenthal et al.
9,057,021 B2 6/2015 Kingsley et al.
9,065,447 B2 6/2015 Buttolo et al.
9,187,034 B2 11/2015 Tarahomi et al.
9,299,887 B2 3/2016 Lowenthal et al.
2002/0159741 A1 10/2002 Graves et al.
2002/0163792 A1 11/2002 Formosa
2003/0167668 A1 9/2003 Fuks et al.
2003/0179548 A1 9/2003 Becker et al.
2004/0213088 A1 10/2004 Fuwausa
2005/0084229 A1 4/2005 Babbitt et al.
2006/0087826 A1 4/2006 Anderson, Jr.
2006/0097121 A1 5/2006 Fugate
2007/0032319 A1 2/2007 Tufte
2007/0268714 A1 11/2007 Chen et al.
2007/0285938 A1 12/2007 Palmer et al.
2007/0297045 A1 12/2007 Sakai et al.
2009/0217970 A1 9/2009 Zimmerman et al.
2009/0219730 A1 9/2009 Syfert et al.
2009/0251920 A1 10/2009 Kino et al.
2009/0260562 A1 10/2009 Folstad et al.
2009/0262515 A1 10/2009 Lee et al.
2010/0102736 A1 4/2010 Hessling
2011/0012062 A1 1/2011 Agrawal et al.
2012/0001406 A1 1/2012 Paxton et al.
2012/0064134 A1 3/2012 Bourke, Jr. et al.
2012/0104954 A1 5/2012 Huang
2012/0182722 A1 * 7/2012 Wu ....................... B60R 13/005 362/157
2012/0183677 A1 7/2012 Agrawal et al.
2012/0280528 A1 11/2012 Dellock et al.
2013/0092965 A1 4/2013 Kijima et al.
2013/0215643 A1 * 8/2013 Hikmet ................ G02B 6/0003 362/606
2013/0335994 A1 12/2013 Mulder et al.
2014/0003044 A1 * 1/2014 Harbers .................... F21K 9/00 362/230
2014/0029281 A1 1/2014 Suckling et al.
2014/0065442 A1 3/2014 Kingsley et al.
2014/0103258 A1 4/2014 Agrawal et al.
2014/0211498 A1 7/2014 Cannon et al.
2014/0264396 A1 9/2014 Lowenthal et al.
2014/0266666 A1 9/2014 Habibi
2014/0373898 A1 12/2014 Rogers et al.
2015/0046027 A1 2/2015 Sura et al.
2015/0109602 A1 4/2015 Martin et al.
2015/0138789 A1 5/2015 Singer et al.
2015/0267881 A1 9/2015 Salter et al.
2016/0016506 A1 1/2016 Collins et al.
2016/0102819 A1 4/2016 Misawa et al.
2016/0236613 A1 8/2016 Trier
2017/0158125 A1 6/2017 Schuett et al.

FOREIGN PATENT DOCUMENTS

CN 201193011 Y 2/2009
CN 204127823 U 1/2015
DE 4120677 A1 1/1992
DE 29708699 U1 7/1997
DE 20206203 U1 12/2002
DE 10319396 A1 11/2004
EP 1793261 A1 6/2007
EP 2778209 A1 9/2014
JP 2000159011 A 6/2000
JP 2007238063 A 9/2007
KR 20060026531 A 3/2006
WO 2006047306 A1 5/2006
WO 2014068440 A1 5/2014
WO 2014161927 A1 10/2014

* cited by examiner

PHOTOLUMINESCENT VEHICLE APPLIQUES

FIELD OF THE INVENTION

The present disclosure generally relates to vehicle appliques, and more particularly, to lighting systems and appliques for automotive vehicles having photoluminescent features.

BACKGROUND OF THE INVENTION

Illumination systems used in vehicles may offer a unique and attractive viewing experience. It is therefore desired to incorporate such illumination systems in portions of vehicles to provide accent and functional lighting.

SUMMARY OF THE INVENTION

According to one aspect of the present invention, a vehicle applique is provided that includes a decorative layer and an over-mold positioned over the decorative layer. The over-mold is substantially transparent. A semiconductor layer is positioned on an opposite side of the decorative layer from the over-mold. The semiconductor layer is configured to emit light through the decorative layer.

According to another aspect of the present invention, a vehicle is provided that includes a grille defining a surface. An applique is positioned on the surface. The applique includes a decorative layer and a semiconductor layer positioned on the decorative layer and a light source positioned proximate the applique configured to emit light onto the applique. The semiconductor layer is configured to be excited by the light from the applique.

According to yet another aspect of the present invention, a vehicle is provided that includes a surface of the vehicle and an applique positioned on the surface. The applique has a decorative layer and a semiconductor layer positioned on the decorative layer and a light source positioned on an opposite side of the semiconductor layer from the decorative layer. The light source is configured to emit light into the semiconductor layer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
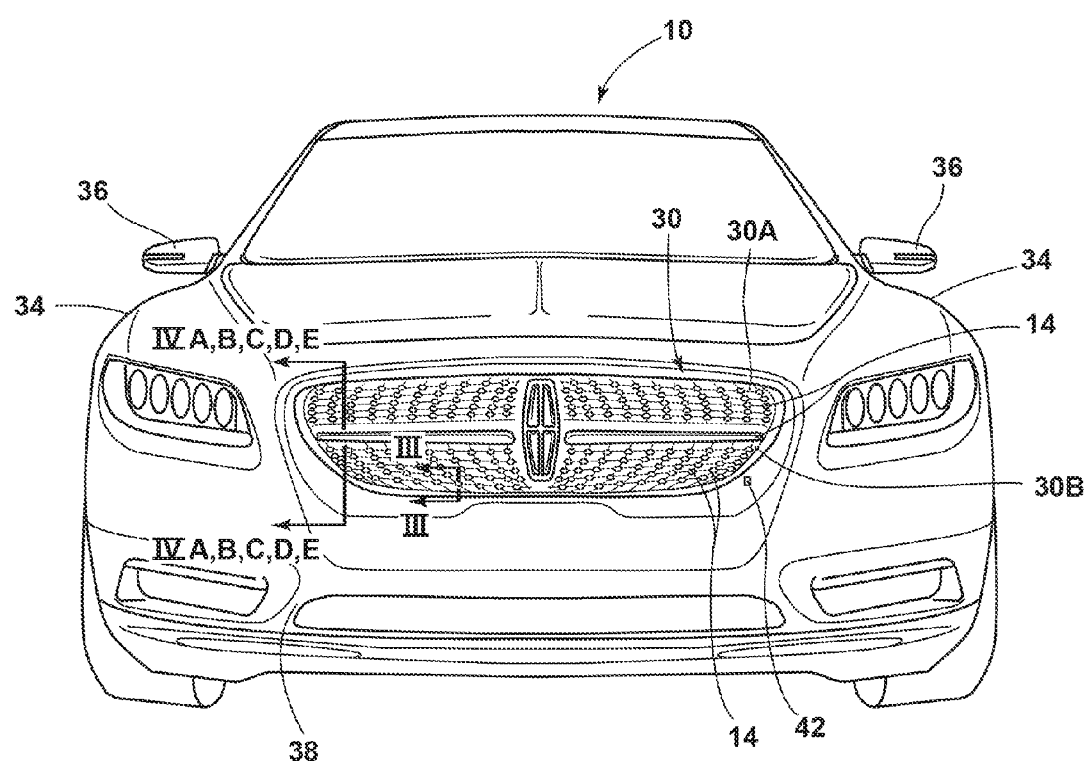
FIG. 1 is front perspective view of a vehicle having an exterior applique, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-5, reference numeral 10 generally designates a vehicle having an applique 14. The applique 14 includes a decorative layer 18 and an over-mold 22 positioned over the decorative layer 18. A semiconductor layer 26 is positioned on an opposite side of the decorative layer 18 from the over-mold 22. The semiconductor layer 26 is configured to emit light through the decorative layer 18.

Figure 2:
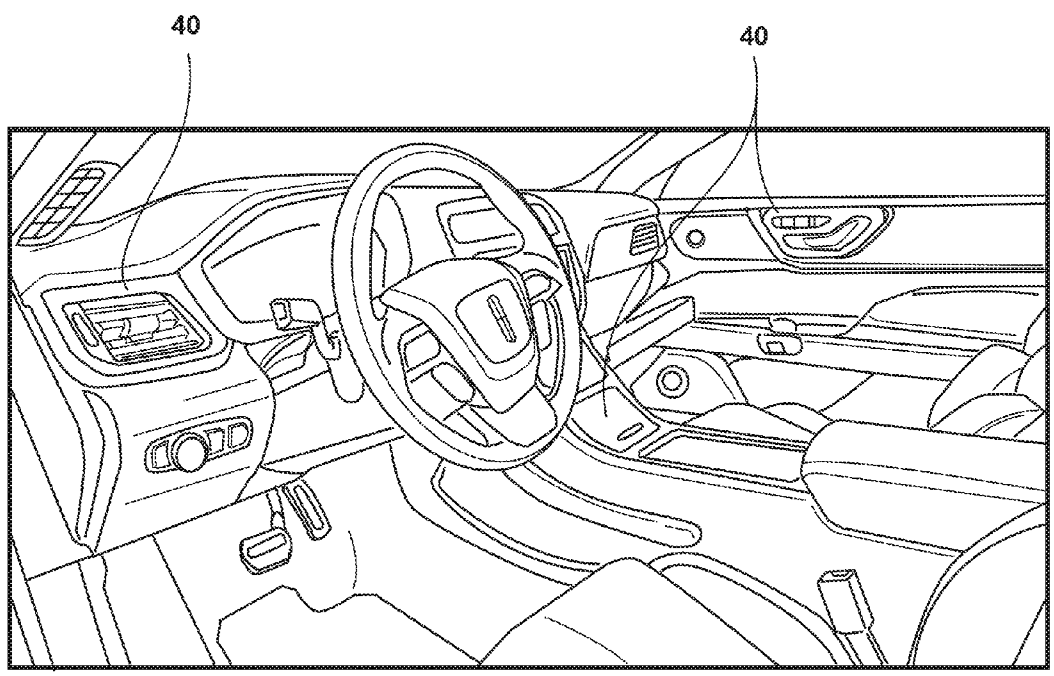
FIG. 2 is a perspective view of an interior of a vehicle having an applique, according to another embodiment.

Referring now to FIGS. 1 and 2, the applique 14 may be positioned in a variety of locations on the exterior and interior of the vehicle 10. For example, the applique 14 may be positioned on an exterior body panel of the vehicle 10 (FIG. 1). In the depicted embodiment, the exterior body panel is a grille 30. It will be understood that the applique 14 may be positioned in one, or a plurality, of locations along exterior and interior body panels of the vehicle 10. For example, the applique 14 may be positioned on fenders 34, exterior mirrors 36, bumpers 38 or other locations around the exterior of the vehicle 10. The grille 30 may define a mesh 30A and a trim 30B on which the applique 14 may be applied. According to various embodiments, the applique 14 may be configured to illuminate. In such embodiments, a light sensor 42 may be positioned proximate the applique 14 (e.g., on or around the grille 30) to monitor the light emitted from the applique 14. In interior embodiments, the applique 14 may be applied to a vehicle interior trim piece 40 (FIG. 2). The interior trim pieces 40 may be positioned around air vents, door handles, the steering wheel, infotainment screens and other locations within the vehicle 10.

Figure 3:
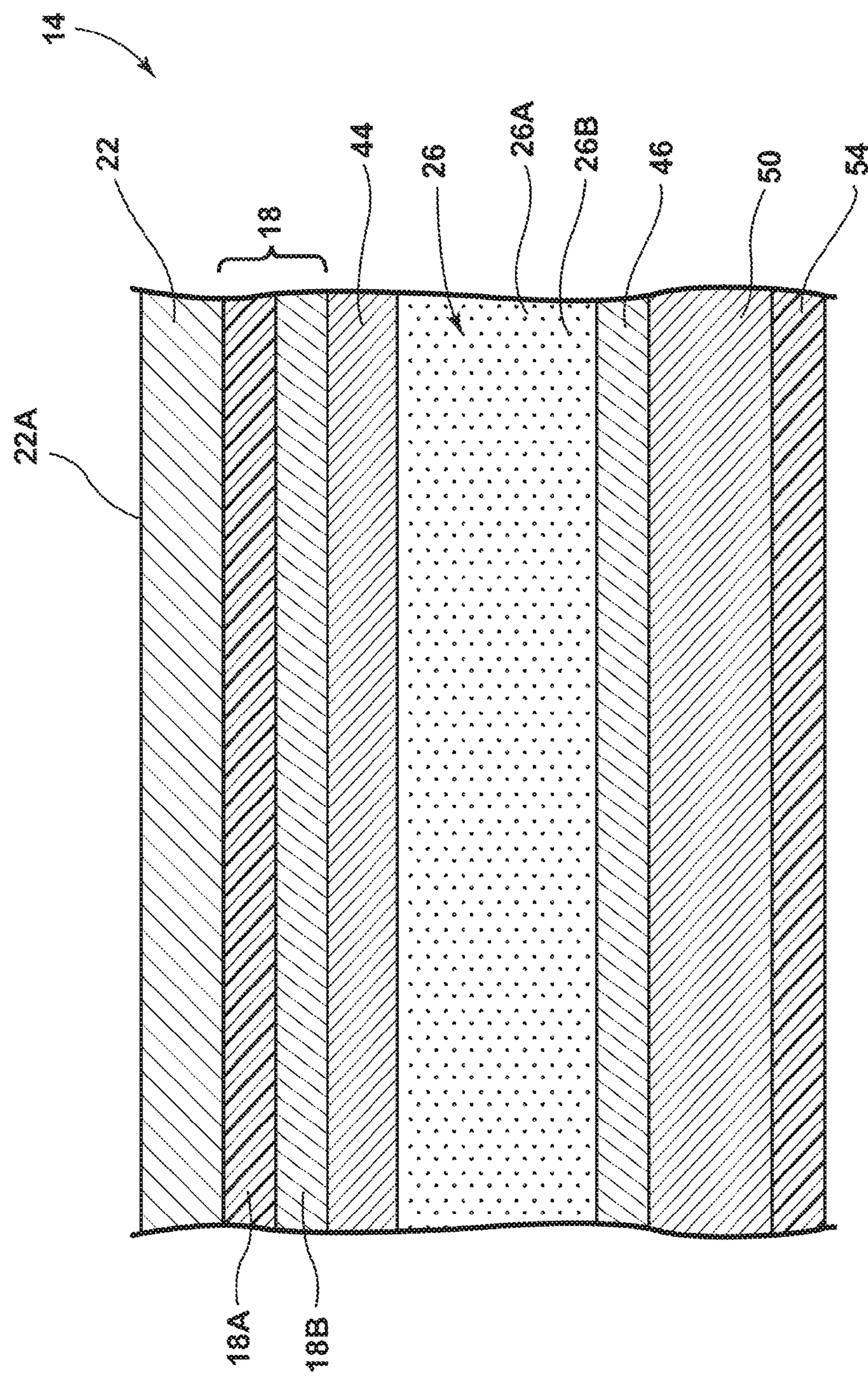
FIG. 3 is a cross-sectional view of the applique taken at line III of FIG. 1, according to one embodiment.

Referring now to the depicted embodiment of FIG. 3, the applique 14 may be a layered structure including the over-mold 22, the decorative layer 18, a first adhesive layer 44, the semiconductor layer 26, a second adhesive layer 46, a reflective layer 50 and a securement layer 54. The decorative layer 18 may define an indicium. The decorative layer 18 may be embossed, textured, engraved, or otherwise modified in thickness to produce the indicium. The indicium may be raised or lowered relative to the rest of the decorative layer 18. The indicium may include a symbol, alpha numeric text, a picture, a number, or a combination thereof. The decorative layer 18 may define one or more discrete indicium (e.g., multiple separate indicia spaced across the decorative layer 18). The decorative layer 18 may be a polymeric material, a metal, or combinations thereof. In some examples, the decorative layer 18 may be a metal or metallic foil. In metallic examples of the decorative layer 18, the decorative layer 18 may have a luster or shine configured to reflect light. In polymeric examples of the decorative layer 18, the decorative layer 18 may have a vacuumized metal surface configured to reflect light. In some embodiments, the decorative layer 18 includes a plastic substrate 18B with a vacuumized metal 18A that may both reflect and transmit light. In such embodiments, the decorative layer 18 may transmit greater than 10%, 20%, 30%, 40%, 50%, 60%, 70%, 80% or 90% of light while reflecting the rest. The decorative layer 18 may be painted, or otherwise colored or dyed, to produce aesthetically pleasing colors. Additionally or alternatively, the decorative layer 18 may provide a textured appearance to the applique 14. For example, the decorative layer 18 may appear as wood grain, brushed metal (e.g., aluminum and/or nickel), leather, vinyl, or other textured appearances which may be aesthetically pleasing.

Positioned on, over and/or across the decorative layer 18 is the over-mold 22. The over-mold 22 may define a first or exterior surface 22A. The over-mold 22 may have a transparency to light in a visible spectrum (e.g., about 400 nm to about 700 nm) of greater than about 50%, 60%, 70%, 80%, 90% or 99%. The over-mold 22 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof. The over-mold 22 may have a thickness, or greatest diameter, of between about 0.01 mm to about 10.0 mm, or between about 0.25 mm to about 0.5 mm. In silicone examples, the over-mold 22 may have a density of about 1150 $kg/m^2$. Use of the over-mold 22 may allow for the dampening or reduction of acoustic energy through the applique 14. For example, use of the over-mold 22 on the interior or exterior vehicle component may allow for an acoustic power reduction through the applique 14 of greater than about 1 dB, 5 dB, 10 dB, or greater than 20 dB. As such, the over-mold 22 may dampen or otherwise reduce vibrations and rattle of the vehicle component to which it is applied. In some examples, the over-mold 22 may include a colorant (e.g., to color or filter the light passing through or being reflected off of the applique 14), an ultra violet inhibitor or blocker (e.g., a hindered amine or benzoyl), or infrared blocking material (e.g., aluminosilicates and/or metal oxides). Further, use of the over-mold 22 provides a protective layer to the applique 14 and/or the interior or exterior surface to which the applique 14 is applied. The over-mold 22 may create a slick and hydrophobic surface which may repel rain, oils, road grime, or other contaminants found in and around the exterior of the vehicle 10 which will allow the applique 14 to stay cleaner. The over-mold 22 may have a viscoelasticity (i.e., having both viscosity and elasticity), a low Young's modulus, and/or a high failure strain compared with other materials, so that the over-mold 22 may protect the applique 14 and/or vehicle 10 when contact is made thereto (i.e., to prevent scratches, protect against impact, reduce vibration, etc.). Further, the viscoelasticity, low Young's modulus, and/or a high failure strain may provide a soft, elegant feel to the applique 14 which may make it pleasing to touch or feel.

The over-mold 22 may define one or more textures (e.g., an exterior surface) on the exterior surface 22A. For example, the exterior surface 22A may define a leather, wood grain, smooth, abrasive texture and/or other texture. Such a textured surface may provide the "feel" the appearance of the decorative layer 18 provides. For example, if the decorative layer 18 visually provides a leather appearance, the texture of the over-mold 22 may have a leather texture (e.g., grains and ridges) such that a user of the applique 14 receives the expected tactile stimulation from the over-mold 22 as they expect from the appearance of the applique 14. It will be understood that the appearance and tactile stimulation provided may differ from one another without departing from the teachings provided herein.

The over-mold 22 may be formed by over-molding the decorative layer 18 and/or semiconductor layer 26 using a liquid polymer. The over-molding liquid polymer may have a viscosity of less than about 2000 pa·s, less than about 1000 pa·s, or less than about 100 pa·s when over-molded onto the decorative layer 18 and/or semiconductor layer 26. Preferably, forming the over-mold 26 is performed using an injection molding process. The liquid polymer may then be solidified to form the over-mold 22. The exterior surface 22A of the over-mold 22 may have a generally curved shape, or may have a square, rectangular, polygonal, undulating, or other complex shape. Further, the exterior surface 22A can be characterized with portions having planar features and portions having non-planar features.

The first and second adhesive layers 44, 46 may be used to secure the decorative layer 18 and/or the reflective layer 50 in place during formation of the over-mold 22 and/or holding the layers of the applique 14 in place. The first and second adhesive layers 44, 46 may be a clear pressure sensitive adhesive. It will be understood that the first and second adhesive layers 44, 46 are optional. Further, the securement layer 54 may be similar to the first and second adhesive layers 44, 46 in composition and function (i.e., to secure the applique 14 to the vehicle 10).

As explained above, the semiconductor layer 26 is configured to emit light. According to various embodiments, the semiconductor layer 26 may be configured to emit light in response to receiving an excitation emission. The semiconductor layer 26 may include a binder 26A and a photoluminescent semiconductor material 26B. The binder 26A may be an optically transparent or translucent material such as polymethylmethacrylate, nylon, polycarbonate, polyester and/or polyvinyl chloride can also be used. The photoluminescent semiconductor material 26B may include one or more quantum dots. Quantum dots are nanoscale semiconductor devices that tightly confine either electrons or electron holes in all three spatial dimensions and may be photoluminescent. The photoluminescence of a quantum dot can be manipulated to specific wavelengths by controlling the particle diameter of the quantum dots. Quantum dots may have a radius, or a distance half of their longest length, in the range of between about 1 nm and about 10 nm, or between about 2 nm and about 6 nm. Larger quantum dots (e.g., radius of 5-6 nm) emit longer wavelength light resulting in the color of the light being such colors as orange or red. Smaller quantum dots (e.g., radius of 2-3 nm) emit shorter wavelengths resulting in colors such as blue and green. It will be understood that the wavelength of light emitted from the quantum dots may vary depending on the exact composition of the quantum dots. Quantum dots naturally produce monochromatic light. Exemplary compositions of the quantum dots include $LaF_3$ quantum dot nanocrystals that are doped (e.g., coated) with Yb—Er, Yb—Ho and/or Yb—Tm. Other types of quantum dots that can be used include various types of tetrapod quantum dots and perovskite enhanced quantum dots. It will be understood that one or more types of quantum dots may be mixed or otherwise used in the semiconductor layer 26.

The quantum dot embodiments of the photoluminescent semiconductor material 26B may be configured to emit light in response to an excitation emission. According to various embodiments, the quantum dots may be configured to emit light by up-converting excitation light. Up-conversion works by absorbing two or more photons of a longer wavelength excitation emission. Once absorbed, the quantum dots may emit one or more photons having a shorter wavelength than the wavelengths of the excitation emission. According to various embodiments, the excitation emission may be infrared light. In such embodiments, the excitation emission may have a wavelength of between about 800 nm and about 1000 nm. In the specific embodiment, the excitation emission may have a wavelength of about 980 nm. A 980 nm wavelength is chosen since red, blue and green emitting colloidal quantum dots of these species can efficiently absorb this wavelength of light and LEDs of this wavelength are commercialized and readily available. This means the semiconductor layer 26 can emit virtually any color including white, except shades of purple, when charged or excited with infrared light and the proper sized quantum dots are used.

According to various embodiments, the semiconductor layer 26 may be structurally formed as a film. In a first method of forming the semiconductor layer 26, the photoluminescent semiconductor material 26B may be blended directly into the binder 26A. Next, the mixture of semiconductor material 26B and binder 26A may be extruded into a thin sheet of film. Another exemplary method of producing the semiconductor layer 26 is to apply a thin coating of the semiconductor material 26B to a surface. To do this, the semiconductor material 26B is first blended into a polymer or a polymerizable mixture of monomers. Next, the mixture is then spin coated, ink jetted or otherwise applied as a thin layer over a surface (e.g., of a film, substrate or vehicle component). Monomer mixtures can be polymerized (cured) on the surface after application. Using this approach, it may be important to assure that the polymer or monomer mixture is lipophilic (non-polar) if organic soluble semiconductor material 26B is being used. Conversely, if water soluble photoluminescent semiconductor material 26B is being used, the polymer or monomers may be hydrophilic (water soluble).

Positioned below the second adhesive layer 46 is the reflective layer 50. The reflective layer 50 is configured to reflect and scatter light emitted by the semiconductor layer 26, and ambient light that has passed through the decorative layer 18 and semiconductor layer 26 back into the semiconductor layer 26. The reflective layer 50 may be composed of a reflective component such as $TiO_2$ (e.g., rutile), a metal with a high luster finish and/or other reflective components. According to one embodiment, an opaque white polymer film using at least 5% by weight of a$TiO_2$ pigment and a polymethylmethacrylate that is about 0.02 microns in diameter.

Figure 4A:
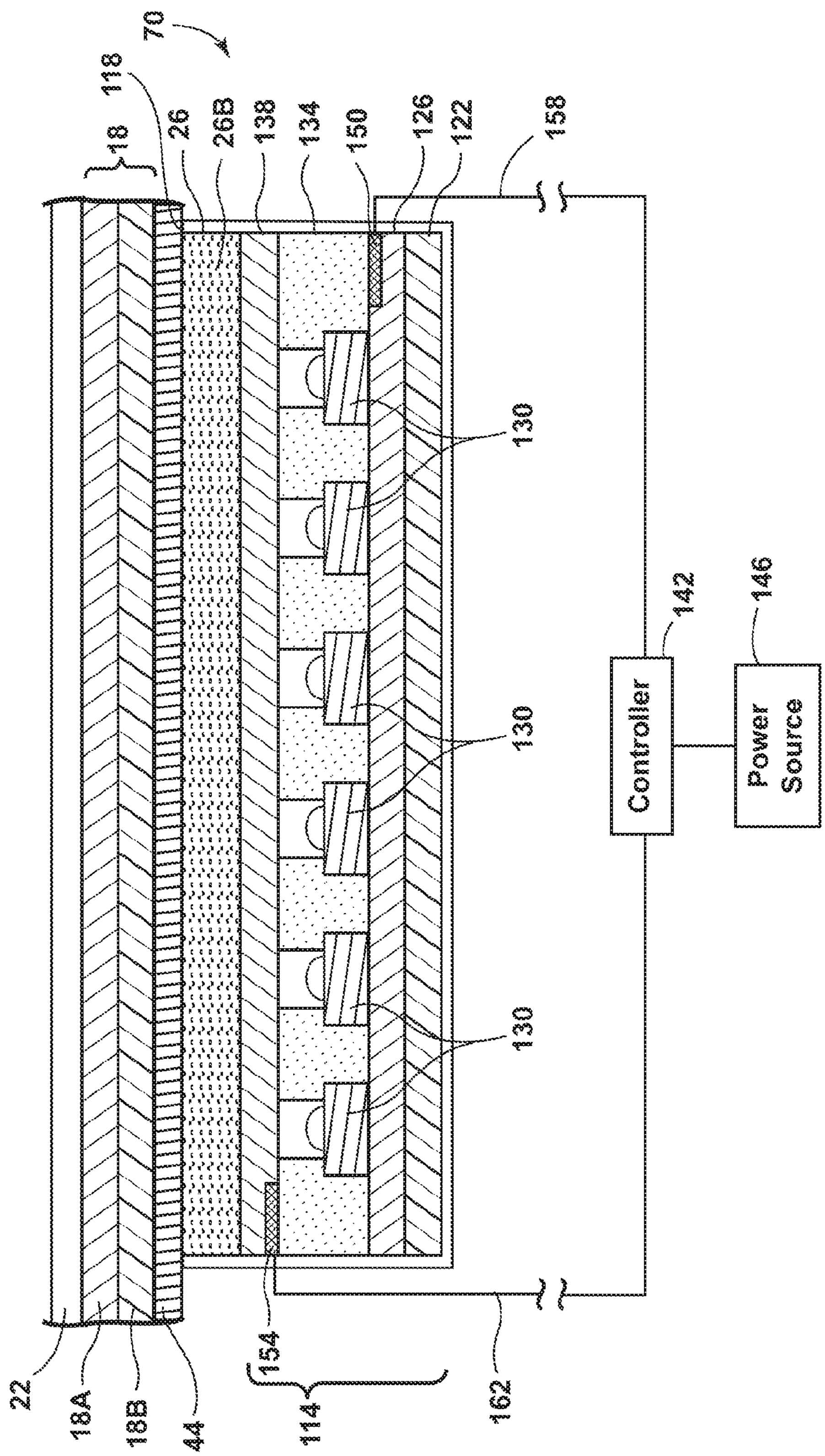
FIG. 4A is a cross-sectional view of the applique taken at line IVA of FIG. 1, illustrating a light assembly according to one embodiment.

Referring to FIGS. 4A-E, depicted are an embodiments in which the reflective layer 50 (FIG. 3) is replaced with a light source 70. As illustrated in FIG. 4A, the light source may 70 have a stacked arrangement that includes a light-producing assembly 114. The light-producing assembly 114 may correspond to a thin-film or printed light emitting diode (LED) assembly and includes a substrate 122 as its lowermost layer. The substrate 122 may include a polycarbonate, polymethylmethacrylate (PMMA), or polyethylene terephthalate (PET) material on the order of 0.005 to 0.060 inches thick and is arranged over the intended vehicle substrate on which the light source 70 is to be received (e.g., a panel of the vehicle 10). Alternatively, as a cost saving measure, the substrate 122 may directly correspond to a preexisting structure (e.g., the vehicle panel).

The light-producing assembly 114 includes a positive electrode 126 arranged over the substrate 122. The positive electrode 126 includes a conductive epoxy such as, but not limited to, a silver-containing or copper-containing epoxy. The positive electrode 126 is electrically connected to at least a portion of a plurality of LED sources 130 arranged within a semiconductor ink 134 and applied over the positive electrode 126. Likewise, a negative electrode 138 is also electrically connected to at least a portion of the LED sources 130. The negative electrode 138 is arranged over the semiconductor ink 134 and includes a transparent or translucent conductive material such as, but not limited to, indium tin oxide. Additionally, each of the positive and negative electrodes 126, 138 are electrically connected to a controller 142 and a power source 146 via a corresponding bus bar 150, 154 and conductive elements 158, 162. The bus bars 150, 154 may be printed along opposite edges of the positive and negative electrodes 126, 138 and the points of connection between the bus bars 150, 154 and the conductive leads 158, 162 may be at opposite corners of each bus bar 150, 154 to promote uniform current distribution along the bus bars 150, 154. It should be appreciated that in alternate embodiments, the orientation of components within the light-producing assembly 114 may be altered without departing from the concepts of the present disclosure. For example, the negative electrode 138 may be disposed below the semiconductor ink 134 and the positive electrode 126 may be arranged over the aforementioned semiconductor ink 134. Likewise, additional components, such as the bus bars 150, 154, may also be placed in any orientation such that the light-producing assembly 114 may emit outputted light 166 (FIG. 4B) toward a desired location.

The LED sources 130 may be dispersed in a random or controlled fashion within the semiconductor ink 134 and may be configured to emit focused or non-focused light toward the semiconductor layer 26. According to various embodiments, the LED sources 130 may be configured to emit infrared light. The LED sources 130 may correspond to micro-LEDs of gallium nitride elements on the order of about 5 to about 400 microns in size and the semiconductor ink 134 may include various binders and dielectric material including, but not limited to, one or more of gallium, indium, silicon carbide, phosphorous, and/or translucent polymeric binders.

The semiconductor ink 134 can be applied through various printing processes, including ink jet and silk screen processes, to selected portion(s) of the positive electrode 126. More specifically, it is envisioned that the LED sources 130 are dispersed within the semiconductor ink 134, and shaped and sized such that a substantial quantity of the LED sources 130 align with the positive and negative electrodes 126, 138 during deposition of the semiconductor ink 134. The portion of the LED sources 130 that ultimately are electrically connected to the positive and negative electrodes 126, 138 may be illuminated by a combination of the bus bars 150, 154, controller 142, power source 146, and conductive leads 158, 162. According to one embodiment, the power source 146 may correspond to a vehicular power source 146 operating at 12 to 16 VDC. Additional information regarding the construction of light-producing assemblies 114 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring now to FIG. 4A, the semiconductor layer 26 is arranged over the negative electrode 138 as a coating, layer, film or other suitable deposition. The decorative layer 18 is arranged over the semiconductor layer 26. In some embodiments, the decorative layer 18 is molded over the semiconductor layer 26 and light-producing assembly 114. As explained above, the decorative layer 18 may be at least partially light transmissible. In this manner, the decorative layer 18 will be illuminated by the semiconductor layer 26 whenever an energy conversion process is underway.

A protective coating 118 is disposed around the light-producing assembly 114 and/or semiconductor layer 26. The protective coating 118 may protect the light-producing assembly 114 from physical and chemical damage arising from environmental exposure. The protective coating 118 may have viscoelasticity (i.e., having both viscosity and elasticity), a low Young's modulus, and/or a high failure strain, compared with other materials, so that the protective coating 118 may protect the light-producing assembly 114 when contact is made thereto. For example, the protective coating 118 may protect the light-producing assembly 114 from the environmental contaminants, such as dirt and water, which may come in contact with the light source 70 during manufacturing.

In some embodiments, the semiconductor layer 26 may be employed separate and away from the light-producing assembly 114. For example, the semiconductor layer 26 may be positioned on an opposite side of the decorative layer 18, another location of the applique 14, and/or any surface proximate the light-producing assembly 114.

Figure 4B:
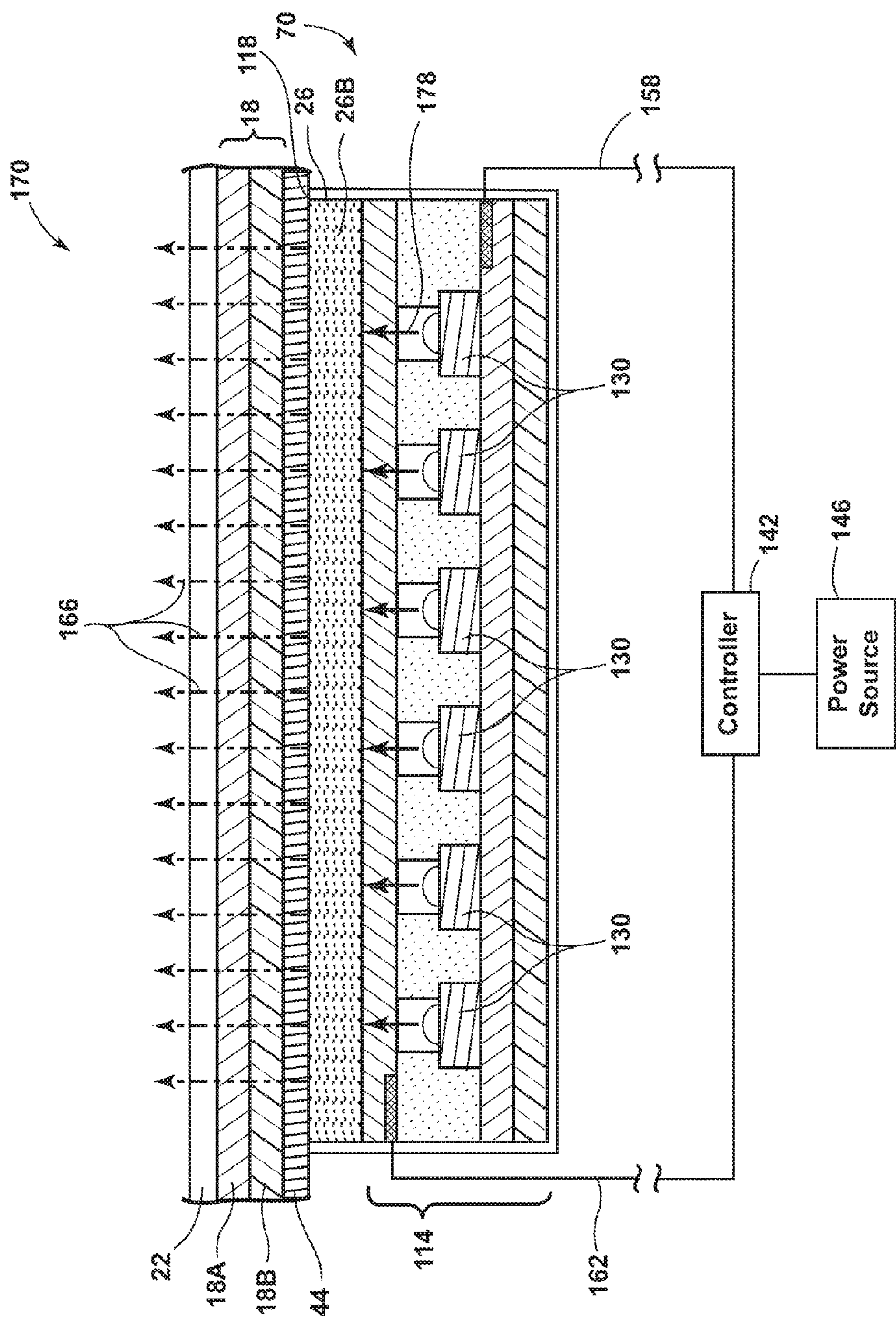
FIG. 4B is a cross-sectional view of the applique taken at line IVB of FIG. 1, further illustrating the light assembly, according to one embodiment.

Referring now to FIG. 4B, an energy conversion process 170 for producing single color luminescence is illustrated, according to one embodiment. For purposes of illustration, the energy conversion process 170 is described below using the light source 70 depicted in FIG. 4A. In this embodiment, the semiconductor layer 26 includes a single semiconductor material 26B, which is configured to convert inputted light 178 received from LED sources 130 into the outputted light 166 having a wavelength different than that associated with the inputted light 178. More specifically, the semiconductor material 26B is formulated to have an absorption spectrum that includes the emission wavelength of the inputted light 178 supplied from the LED sources 130. The semiconductor material 26B is also formulated to convert light and result in the converted visible outputted light 166 having an emission spectrum expressed in a desired color, which may vary per lighting application. The converted visible outputted light 166 is outputted from the light source 70 via the decorative layer 18, thereby causing the decorative layer 18 to illuminate in the desired color. The illumination provided by the decorative layer 18 may offer a unique, substantially uniform, and/or attractive, viewing experience that may be difficult to duplicate through non-photoluminescent means.

Figure 4C:
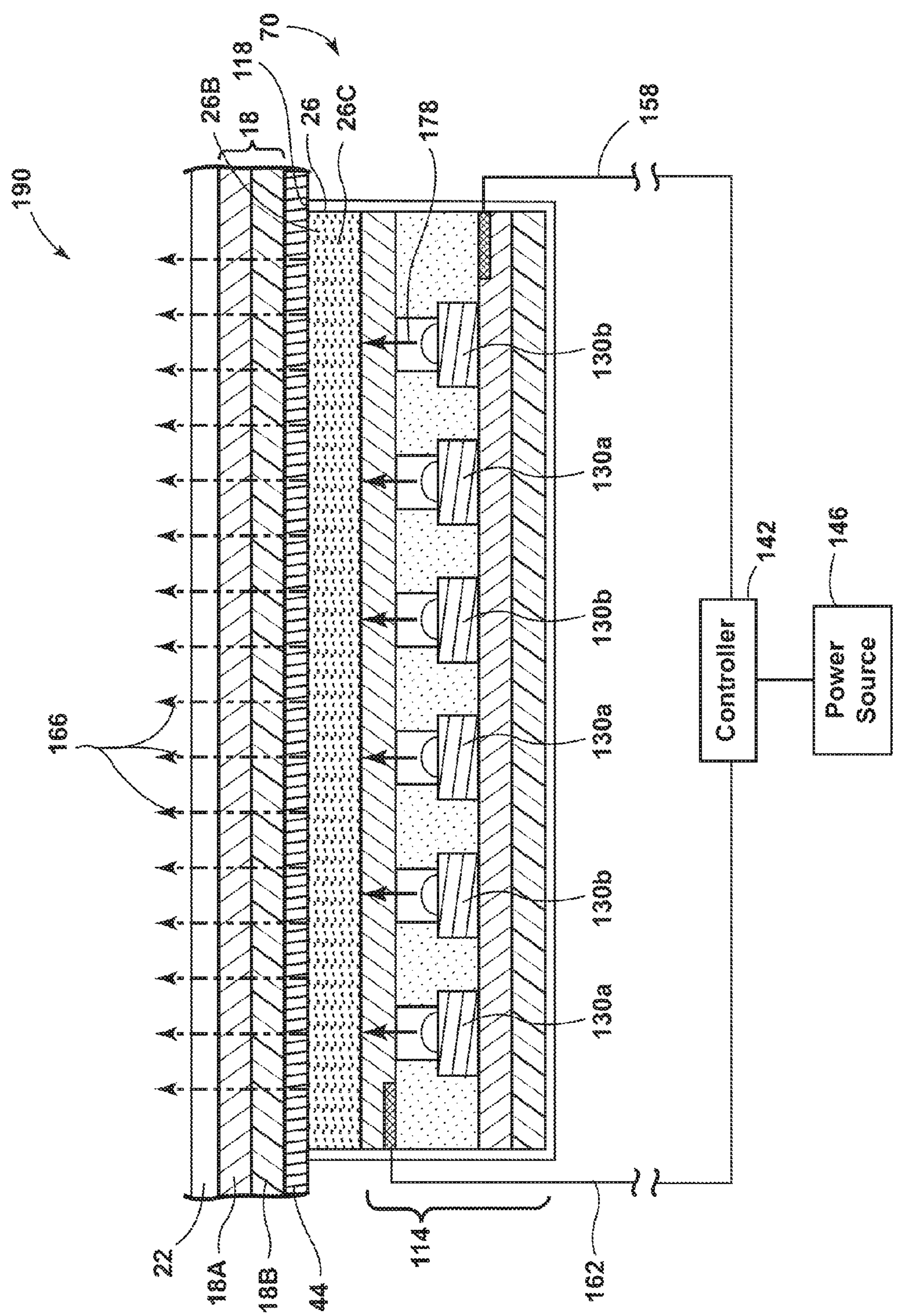
FIG. 4C is a cross-sectional view of the applique taken at line IVC of FIG. 1, illustrating an alternate light assembly, according to one embodiment.

Referring to FIG. 4C, a second energy conversion process 190 for generating multiple colors of light is illustrated, according to one embodiment. For consistency, the second energy conversion process 190 is also described below using the light source 70 depicted in FIG. 4A. In this embodiment, the semiconductor layer 26 includes the semiconductor material 26B and a second semiconductor layer 26C. Alternatively, the semiconductor materials 26B, 26C may be isolated from each other, if desired.

With respect to the presently illustrated embodiment, the excitation of semiconductor materials 26B, 26C is mutually exclusive. That is, semiconductor materials 26B, 26C are formulated to have non-overlapping absorption spectrums that yield different emission spectrums. Also, in formulating the semiconductor materials 26B, 26C, care should be taken in choosing the associated up-conversions such that the converted outputted light 166 emitted from one of the semiconductor materials 26B, 26C, does not excite the other, unless so desired. According to one exemplary embodiment, a first portion of the LED sources 130, exemplarily shown as LED sources 130*a*, is configured to emit an inputted light 178 having an emission wavelength that only excites semiconductor material 26B and results in the inputted light 178 being converted into a visible outputted light 166 of a first color (e.g., white). Likewise, a second portion of the LED sources 130, exemplarily shown as LED sources 130*b*, is configured to emit an inputted light 178 having an emission wavelength that only excites the second semiconductor material 26C and results in the inputted light 178 being converted into a visible outputted light 166 of a second color (e.g., red). Preferably, the first and second colors are visually distinguishable from one another. In this manner, LED sources 130*a* and 130*b* may be selectively activated using the controller 142 to cause the semiconductor layer 26 to luminesce in a variety of designable colors. For example, the controller 142 may activate only LED sources 130*a* to exclusively excite semiconductor material 26B resulting in the decorative layer 18 illuminating in the first color. Alternatively, the controller 142 may activate only LED sources 130*b* to exclusively excite the second semiconductor material 26C, resulting in the decorative layer 18 illuminating in the second color.

Alternatively still, the controller 142 may activate LED sources 130*a* and 130*b* in concert, which causes both of the semiconductor materials 26B, 26C to become excited, resulting in the decorative layer 18 illuminating in a third color, which is a color mixture of the first and second colors (e.g., pinkish). The intensities of the inputted light 178 emitted from each portion of the LED sources 130*a*, 130*b* may also be proportionally varied to one another such that additional colors may be obtained. For semiconductor layers 26 containing more than two distinct semiconductor materials 26B, 26C, a greater diversity of colors may be achieved. Contemplated colors include red, green, blue, and combinations thereof, including white, all of which may be achieved by selecting the appropriate semiconductor materials 26B, 26C and correctly manipulating the corresponding LED sources 130*a*, 130*b*.

Figure 4D:
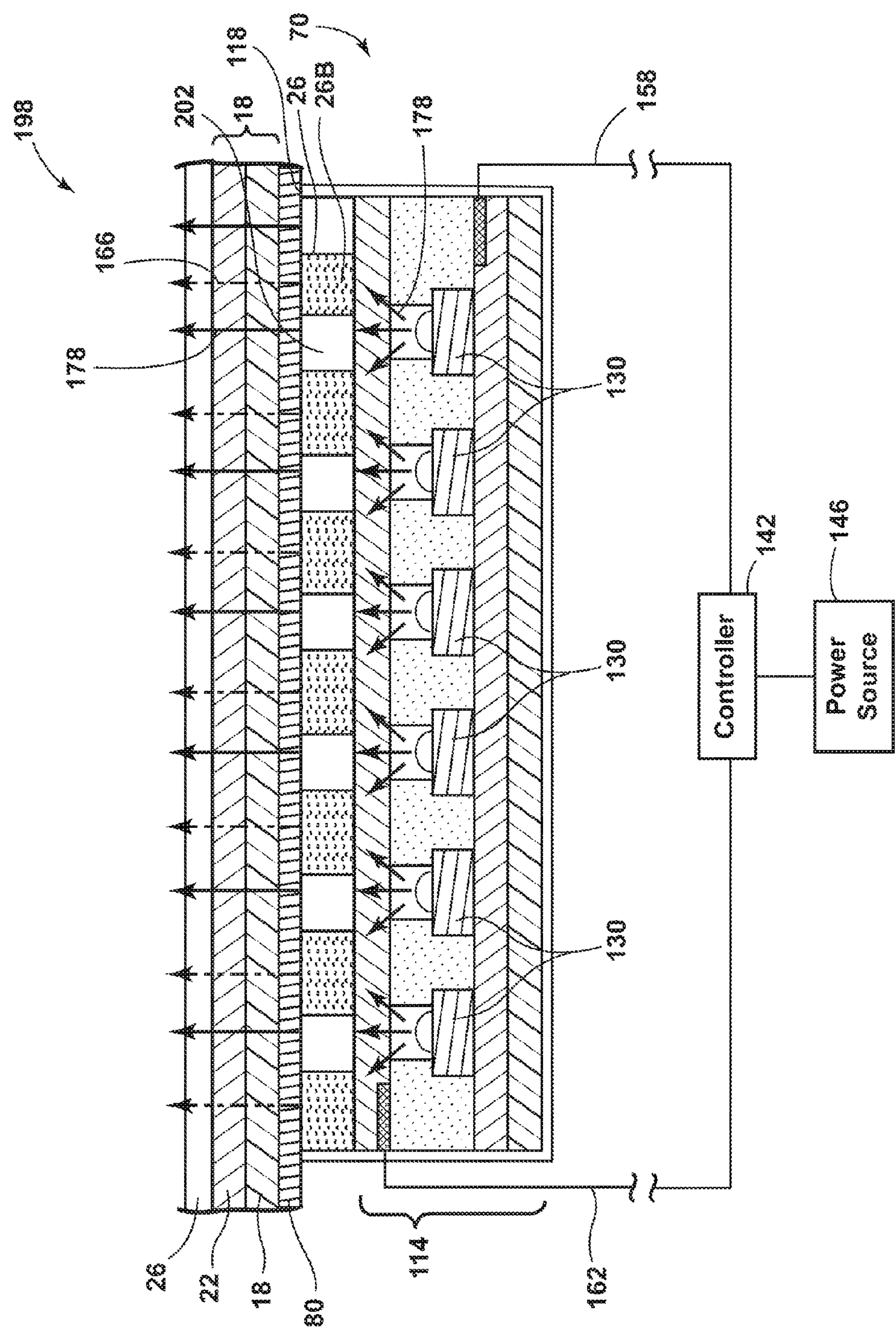
FIG. 4D is a cross-sectional view of the applique taken at line IVD of FIG. 1, illustrating a light assembly having a luminescent structure separated by light transmissive portions disposed on the light source, according to another embodiment.

Referring to FIG. 4D, a third energy conversion process 198 includes the light-producing assembly 114, such as the one described in reference to FIG. 4A, and the semiconductor layer 26 disposed thereon, according to an alternate embodiment. The semiconductor layer 26 is configured to convert inputted light 178 received from LED sources 130 into a visible outputted light 166 having a wavelength different than that associated with the inputted light 178. More specifically, the semiconductor layer 26 is formulated to have an absorption spectrum that includes the emission wavelength of the inputted light 178 supplied from the LED sources 130. The semiconductor material 26B is also formulated to have an up-conversion resulting in the converted visible outputted light 166 having an emission spectrum expressed in a desired color, which may vary per lighting application.

The semiconductor layer 26 may be applied to a portion of the light-producing assembly 114, for example, in a stripped manner. Between the semiconductor layers 26 may be light transmissive portions 202 that allow inputted light 178 emitted from the LED sources 130 to pass therethrough at the first wavelength. The light transmissive portions 202 may be an open space, or may be a transparent or translucent material. The inputted light 178 emitted through the light transmissive portions 202 may be directed from the light-producing assembly 114 towards the decorative layer 18 such that the decorative layer 18 may emit a colored light corresponding to the inputted light 178 that is directed through the light transmissive portions 202.

Figure 4E:
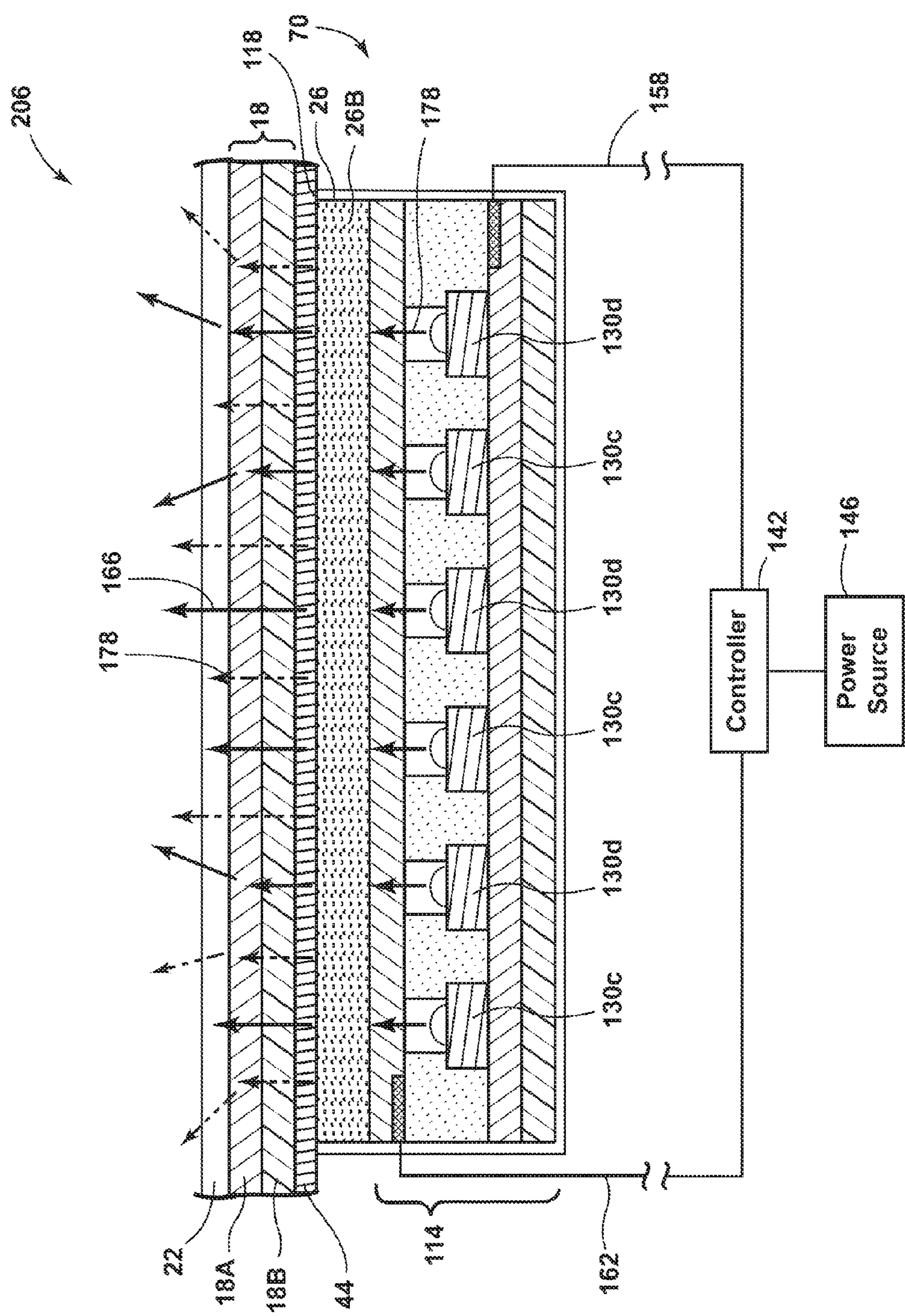
FIG. 4E is a cross-sectional view of the applique taken at line WE of FIG. 1, illustrating an alternate light source having a luminescent structure disposed on the light source configured to convert a portion of light emitted from the light source from a first wavelength to a second wavelength, according to one embodiment.

Referring to FIG. 4E, a fourth energy conversion process 206 for generating multiple colors of light utilizing the light-producing assembly 114, such as the one described in reference to FIG. 4A, and the semiconductor layer 26 disposed thereon is illustrated. In this embodiment, the semiconductor layer 26 is disposed over a top portion of the light-producing assembly 114. The excitation of semiconductor material 26B is formulated such that a portion of inputted light 178 emitted from LED sources 130*c*, 130*d* passes through the semiconductor layer 26 at the first wavelength (i.e., the inputted light 178 emitted from the light-producing assembly 114 is not converted by the semiconductor layer 26). The intensity of the emitted light (i.e., the combination of the inputted light 178 and outputted light 166) may be modified by pulse-width modulation or current control to vary the amount of inputted light 178 emitted from the LED sources 130*c*, 130*d* that pass through the semiconductor layer 26 without converting to a second, outputted light 166 wavelength. For example, if the light-producing assembly 114 is configured to emit inputted light 178 at a low level, substantially, all of the inputted light 178 may be converted to outputted light 166. In this configuration, a color of outputted light 166 corresponding to the semiconductor layer 26 may be emitted from the light-producing assembly 114. If the light-producing assembly 114 is configured to emit inputted light 178 at a high level, only a portion of the first wavelength may be converted by the semiconductor layer 26. In this configuration, a first portion of the emitted light may be converted by the semiconductor layer 26 and a second portion of the emitted light may be emitted from the light-producing assembly 114 at the first wavelength towards additional semiconductor layers disposed proximately to the light source 70. The additional semiconductor layers may luminesce in response to the inputted light 178 emitted from the light source 70.

According to one exemplary embodiment, a first portion of the LED sources 130, exemplarily shown as LED sources 130*c*, is configured to emit an inputted light 178 having a wavelength that excites the semiconductor material 26B within the semiconductor layer 26 and results in the inputted light 178 being converted into a visible outputted light 166 of a first color (e.g., white). Likewise, a second portion of the LED sources 130, exemplarily shown as LED sources 130*d*, are configured to emit an inputted light 178 having a wavelength that passes through the semiconductor layer 26 and excites additional semiconductor layers disposed proximately to the applique 14, thereby illuminating in a second color. The first and second colors may be visually distinguishable from one another. In this manner, LED sources 130*c* and 130*d* may be selectively activated using the controller 142 to cause the decorative layer 18 to luminesce in a variety of colors.

Figure 5:
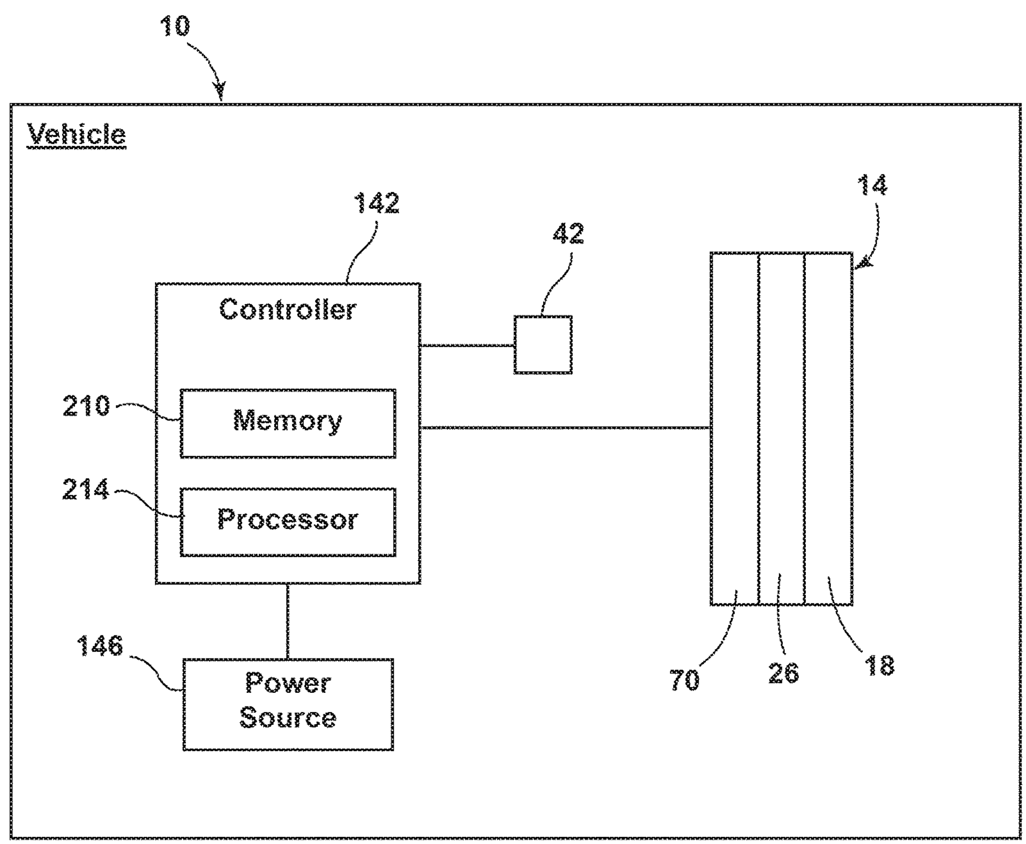
FIG. 5 is a block diagram of the vehicle and the lighting system.

Referring now to FIG. 5, a block diagram of the vehicle 10 is shown in which the decorative layer 18 is positioned within the applique 14. The vehicle 10 includes the controller 142 in communication with the light source 70. The controller 142 may include a memory 210 having instructions contained therein that are executed by a processor 214 of the controller 142. The controller 142 may provide electrical power to the light source 70 via the power source 146 located onboard the vehicle 10. In addition, the controller 142 may be configured to control the light output of the light source 70 based on feedback received from one or more vehicle control modules. The controller 142 may be configured to operate the LED sources 130 (FIGS. 4A-4E), the first portion of LEDs 130*a* and/or the second portion of LEDs 130*b* separately and/or in an alternating manner (e.g., via current direction manipulation) in order to achieve a specific lighting appearance for the applique 14. In some embodiments, the light source 70 may be operated such that portions of the light-producing assembly 114 (FIGS. 4A-E) are activated and other portions are not such that the decorative layer 18 appears to be multicolored, has a pulsing effect, a specific feature is/isn't illuminated and/or has a gradient to the color or intensity of light. By activating the light-producing assembly 114, the color of the illumination from the decorative layer 18 may change from a first color to a second color. The change in color of the decorative layer 18 may serve to communicate information (e.g., speed, transmission state, occupancy, indicate a turn), provide aesthetic lighting (e.g., pulse with music, provide warm ambient lighting, pulse with a sensed heartbeat) or to provide large area ambient illumination to an exterior of the vehicle 10. The controller 142 may further be connected to the light sensor 42 such that the light source 70 may be activated upon sensing that the applique 14 is not outputting a desired level of light.

Use of the present disclosure may offer several advantages. First, as the semiconductor material 26A, 26B, allows for the use of infrared light as an excitation source, ultraviolet light may not be used. The use of near visible infrared light may not degrade paints, plastics or cause damage to the interior of a vehicle the way other light sources may. Second, use of infrared light as an excitation source for the applique 14 means that ambient lighting may charge and excite the semiconductor layer 26 such that minimal power requirements are placed on the vehicle 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovation have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle applique, comprising a decorative layer;

an over-mold positioned over the decorative layer, the over-mold being substantially transparent;

a light conversion layer positioned on an opposite side of the decorative layer from the over-mold and configured to convert ambient infrared illumination; and a reflective layer configured to reflect light into the light conversion layer.

2. The vehicle applique of claim 1, wherein the reflective layer comprises $TiO_2$.

3. The vehicle applique of claim 2, further comprising:

an adhesive layer positioned on an opposite side of the reflective layer than the light conversion layer.

4. The vehicle applique of claim 1, wherein the light conversion layer comprises a plurality of quantum dots.

5. The vehicle applique of claim 4, wherein the plurality of quantum dots are suspended in polymethylmethacrylate.

6. The vehicle applique of claim 1, wherein the decorative layer is configured to be at least partially transmissive.

7. A vehicle, comprising:

a grille;

an applique positioned on the grille comprising:

a decorative layer; and a light conversion layer positioned on the decorative layer;

a reflective layer configured to reflect light into the light conversion layer; and a light source positioned proximate the applique configured to emit infrared light onto the applique, wherein the light conversion layer is configured to be excited by the light from the light source.

8. The vehicle of claim 7, wherein the light conversion layer is configured to emit light through the decorative layer in response to excitation by the infrared light from the light source.

9. The vehicle of claim 7, wherein the light conversion layer comprises a plurality of quantum dots.

10. The vehicle of claim 7, further comprising:

an over-mold comprising silicone.

11. The vehicle of claim 7, wherein the decorative layer comprises a vacuumized metal.

12. A vehicle, comprising:

a surface of the vehicle;

an applique positioned on the surface comprising:

a decorative layer;

a light conversion layer positioned on the decorative layer; and a light source positioned on an opposite side of the light conversion layer from the decorative layer, the light source configured to emit light having a wavelength greater than about 800 nm into the light conversion layer.

13. The vehicle of claim 12, further comprising:

an adhesive layer positioned between the light source and the surface.

14. The vehicle of claim 13, wherein the surface is an exterior surface and is located on a grille.

15. The vehicle of claim 12, wherein the light conversion layer is configured to emit light having a wavelength less than about 800 nm in response to excitation by the light from the light source.

16. The vehicle of claim 15, wherein the light conversion layer comprises a plurality of quantum dots.

17. The vehicle of claim 16, further comprising:

an over-mold positioned over the decorative layer.

* * * * *